United States Patent
Bentley et al.

(10) Patent No.: US 12,474,565 B1
(45) Date of Patent: Nov. 18, 2025

(54) OPTICAL DEVICE ADAPTER STUD SYSTEMS AND METHODS

(71) Applicant: Hunter's Technology, LLC, Cottonwood, AZ (US)

(72) Inventors: Blu Bentley, Cottonwood, AZ (US); Richard Church, Cottonwood, AZ (US)

(73) Assignee: HUNTER'S TECHNOLOGY, LLC, Cottonwood, AZ (US)

( * ) Notice: Subject to any disclaimer, the term of this patent is extended or adjusted under 35 U.S.C. 154(b) by 0 days.

(21) Appl. No.: 19/060,061

(22) Filed: Feb. 21, 2025

(51) Int. Cl.
*G02B 23/18* (2006.01)

(52) U.S. Cl.
CPC .................... *G02B 23/18* (2013.01)

(58) Field of Classification Search
CPC ....... G02B 23/18; F16M 13/00; F16M 11/041
See application file for complete search history.

(56) References Cited

U.S. PATENT DOCUMENTS

| | | | | |
|---|---|---|---|---|
| 529,633 A * | 11/1894 | Stevens | .................... | F16B 39/32 411/114 |
| 1,020,178 A * | 3/1912 | Battin | ..................... | F16B 39/32 40/124 |
| 5,603,592 A * | 2/1997 | Sadri | .................... | F16B 19/1054 411/39 |
| 7,771,149 B2 * | 8/2010 | Bauer | .................... | F16B 41/002 411/533 |
| 11,048,073 B2 * | 6/2021 | Overfelt | ................. | G02B 23/18 |

OTHER PUBLICATIONS

MUTNT, A Division of Hunters Technology, LLC, Feb. 2025, <https://www.mutntgear.com/products/binocular-to-tripod-adapter-stud?variant=44137982689576>.
MUTNT, A Division of Hunters Technology, LLC, Feb. 2025, <https://www.mutntgear.com/products/swarovski-nl-pure-stud?variant=45559102374184>.
Outdoorsmans, Feb. 2025, <https://outdoorsmans.com/products/outdoorsmans-nl-pure-stud>.
Swarovski Optik, Feb. 2025, <https://www.swarovskioptik.com/us/en/hunting/products/accessories/binocular-accessories-all/binocular-accessories/tas-tripod-adapter>.

* cited by examiner

*Primary Examiner* — Christopher Stanford
(74) *Attorney, Agent, or Firm* — Snell & Wilmer LLP (57) ABSTRACT

An adapter stud system for an optical device can include an adapter stud, a washer, and a fastener. The adapter stud can include a first end, a second end, a stud flange disposed at the second end, and a threaded portion disposed between the stud flange and the first end. The washer can comprise an aperture configured to receive the adapter stud. The aperture can be offset such that a centerline of the aperture is offset from a centerline of the washer. The fastener can be configured to threadingly couple to the threaded portion of the adapter stud. The fastener can be rotated to a tightened position to compress a portion of an optical device adapter housing between the washer and the stud flange to secure the adapter stud system to the optical device.

17 Claims, 8 Drawing Sheets

OPTICAL DEVICE ADAPTER STUD SYSTEMS AND METHODS

FIELD

The present disclosure relates generally to optical accessories, and more specifically, to systems and methods for an adapter for mounting an optical device to a support.

BACKGROUND

Many people prefer to view objects through optical devices for distance viewing, such as telescopes, binoculars, and the like. Such optical devices may allow distant objects to be seen closer as if they are closer to the user. When viewing objects through a hand-held optical device, the magnified objects can appear blurry due to movement of the user's hands. In many cases a user may want to mount the optical device to a stable support, such as a tripod for example, so that the objects viewed through the optical device are stable and clear.

SUMMARY

One aspect of the subject matter described in this disclosure may be embodied in an adapter stud system for an optical device. The adapter stud system generally includes an adapter stud, a washer, and a fastener. The adapter stud includes a first end, a second end, a stud flange disposed at the second end, and a threaded portion disposed between the stud flange and the first end. The washer is configured to receive the adapter stud at least partially therethrough. The fastener is configured to receive the adapter stud at least partially therethrough. The fastener is configured to threadingly couple to the threaded portion of the adapter stud. The fastener is configured to be moved to a tightened position to compress an optical device adapter housing between the washer and the stud flange to secure the adapter stud system to the optical device.

In another aspect, the subject matter may be embodied in an adapter stud system including an adapter stud including a first end, a second end, a stud flange disposed at the second end, and a threaded portion disposed between the stud flange and the first end, a washer comprising an aperture disposed therethrough configured to receive the adapter stud, and a fastener configured to threadingly couple to the threaded portion of the adapter stud. A first centerline of the aperture can be offset from a second centerline of the washer. The fastener is configured to be moved to a tightened position to compress an optical device adapter housing between the washer and the stud flange to secure the adapter stud system to the optical device.

In another aspect, the subject matter may be embodied in a method for installing an adapter stud to an optical device. The method can include disposing the adapter stud at least partially into an optical device adapter housing. The method can further include aligning a washer with an opening in the optical device adapter housing. The method can further include moving a fastener to a tightened position relative to the adapter stud to compress the optical device adapter housing between the washer and the stud flange to secure the adapter stud to the optical device.

In various aspects, the method can further include moving the adapter stud laterally (e.g., radially) relative to the optical device adapter housing. In various aspects, the method can further include, in response to moving the adapter stud laterally, positioning an optical device adapter housing flange between the stud flange and the washer. The optical device adapter housing flange can be compressed between the washer and the stud flange in response to the moving the fastener to the tightened position.

These and other embodiments may optionally include one or more of the following features.

The adapter stud can further include a reduced diameter portion disposed between the threaded portion and the first end. The stud flange, the threaded portion, and the reduced diameter portion can be in coaxial alignment.

The washer can comprise an aperture configured to receive the adapter stud. The aperture can be at least partially defined by a clocking surface configured to contact a stopping surface of the adapter stud for preventing rotation of the washer with respect to the adapter stud. The aperture can be an eccentric aperture having a first centerline axis offset from a second centerline axis of the washer. The adapter stud can include a first diameter portion, a second diameter portion having a second diameter that is greater than a first diameter of the first diameter portion, and a third diameter portion having a third diameter that is equal to or greater than the second diameter. The second diameter portion can comprise the threaded portion. The third diameter portion can comprise the stopping surface.

The washer can include a first surface facing a first direction. The first surface can be configured to contact the fastener. The washer can include a second surface facing a second direction opposite the first direction. The washer can include a washer flange extending from the second surface and having a third surface facing the second direction. The washer flange can comprise a double radius outer surface.

The double radius outer surface can include a first radius portion, a second radius portion, and a blending portion disposed at an intersection between the first radius portion and the second radius portion.

The washer can define an aperture extending between and to the first surface and the third surface.

The washer can define an aperture defined by two opposing round surfaces and two opposing clocking surfaces, the two opposing clocking surfaces extend between and to a first round surface of the two opposing round surfaces and a second round surface of the two opposing round surfaces.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

Disclosed herein are systems, methods, devices, and/or apparatuses for an adapter stud for an optical device, such as binoculars (also referred to as a pair of binoculars). Although described herein in connection with a binocular, aspects of the adapter stud system can be used for any suitable optical device. An adapter stud assembly or system can include a stud, a washer configured to be placed around and/or about the stud, and a fastener (e.g., a nut) configured to be placed around and/or about the stud. The stud includes a stud flange configured to be received at least partially within a binocular adapter housing. The fastener can be tightened to clamp a portion of the binocular adapter housing between the washer and the stud flange for securing the adapter stud to the binocular.

The stud can have a slotted portion for receiving a support adapter (e.g., a tripod adapter). The stud can include a stud flange at one end and a threaded outer diameter (OD) surface located between the slotted portion (also referred to as a reduced diameter portion) and the flange. The stud can also include a stopping surface (e.g., a flat surface) located between the threaded OD surface and the flange. The stopping surface is sized and configured to receive a washer having a complementary clocking surface that rests against the stopping surface to prevent the washer from rotating with respect to the stud while clamping a binocular adapter housing flange between the stud flange and the washer. In this manner, there tend to be no rotating surfaces that directly contact, and impart torque to, the binocular adapter housing during installation (only a clamping force).

An adapter stud system of the present disclosure can improve the installation process and connection between the adapter stud and a binocular adapter housing.

Figure 1A:
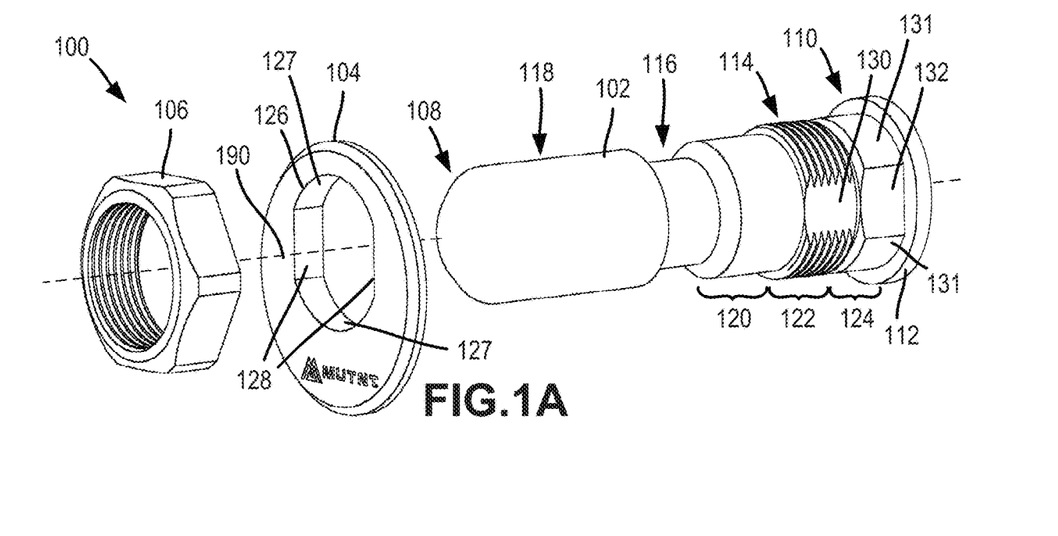
FIG. 1A and FIG. 1B are front perspective and rear perspective assembly views, respectively, of an adapter stud system, in accordance with various examples.
Figure 1B:
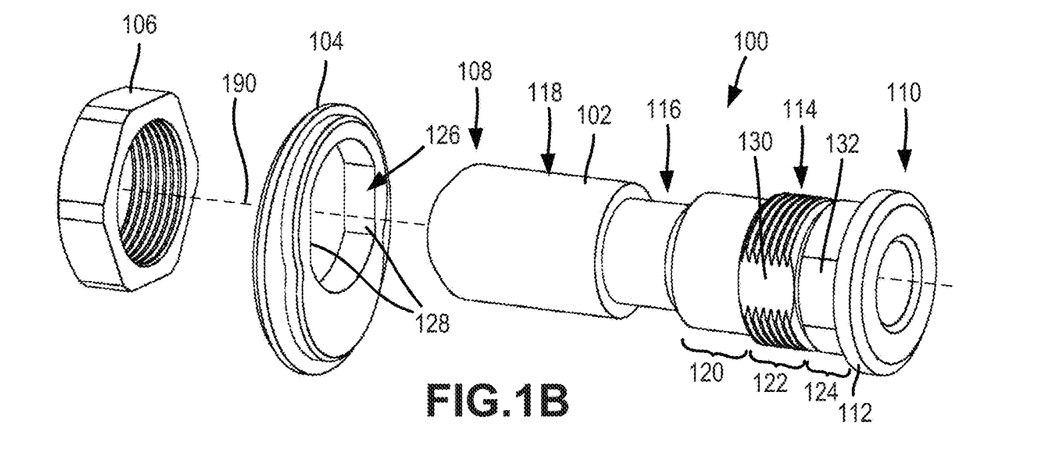

FIG. 1A and FIG. 1B are front perspective and rear perspective assembly views, respectively, of an adapter stud system 100, in accordance with various aspects. The adapter stud system 100 generally includes an adapter stud 102, a washer 104, and a fastener 106 (e.g., a nut or the like). The adapter stud 102 can extend along a central/longitudinal axis 190. The adapter stud 102 can include a first end 108, a second end 110, a stud flange 112 disposed at the second end 110, and a threaded portion 114. The threaded portion 114 can be disposed axially between the stud flange 112 and the first end 108. The stud flange 112 can define a terminus of the adapter stud 102. The threaded portion 114 can be located at the second end 110. The threaded portion 114 can be located closer to the second end 110 than the first end 108.

The adapter stud 102 can further include a reduced diameter portion 116 (e.g., a groove recessed along at least a portion of a circumference of the adapter stud 102) disposed between the threaded portion 114 and the first end 108. An elongated portion 118 can extend from the reduced diameter portion 116 toward the first end 108. In various aspects, the reduced diameter portion 116 can be a slotted portion configured to receive a binocular-to-support adapter or the like. For example, the reduced diameter portion 116 can be configured to receive an adapter for a support such as a tripod, or the like. The elongated portion 118 can be formed as a cylindrical member having a constant diameter. The elongated portion 118 can be formed as a cylindrical member having a substantially constant (variation less than 5%) diameter.

In various aspects, a first diameter portion 120 can extend between and to the reduced diameter portion 116 and the threaded portion 114. The first diameter portion 120 can have a first outer diameter. The first diameter portion 120 can be formed as a cylindrical member having a constant diameter. The first diameter portion 120 can be formed as a cylindrical member having a substantially constant (variation less than 5%) diameter. A second diameter portion 122 can extend between and to the first diameter portion 120 and a third diameter portion 124. The second diameter portion 122 can have a second outer diameter that is greater than the first outer diameter. The second diameter portion 122 can be formed as a cylindrical member having a constant diameter. The second diameter portion 122 can be formed as a cylindrical member having a substantially constant (variation less than 5%) diameter. The second diameter portion 122 can comprise the threaded portion 114. In this manner, the fastener 106 can slide over the first diameter portion 120 before contacting the threads of the threaded portion 114. In this regard, the fastener 106 can be configured to be received over and/or around the first end 108 of the adapter stud 102 and moved axially along the adapter stud 102 toward the second end 110 to the second diameter portion 122. A third diameter portion 124 can extend between and to the second diameter portion 122 and the stud flange 112. The third diameter portion 124 can have a third outer diameter that is equal to the second outer diameter. The third diameter portion 124 can have a third outer diameter that is substantially equal (variation less than 5%) to the second outer diameter. The third outer diameter can be greater than the second outer diameter. The third diameter portion 124 can be formed as a cylindrical member having a substantially constant diameter. The washer 104 can be configured to be received over and/or around the third diameter portion 124. In this regard, the washer 104 can be configured to be received over and/or around the first end 108 of the adapter stud 102 and moved axially along the adapter stud 102 toward the second end 110 to the third diameter portion 124. The stud flange 112 can extend outward from the third diameter portion 124. The stud flange 112 can extend radially outward from the third diameter portion 124. The stud flange 112 can be formed as a cylindrical member. The elongated portion 118, the reduced diameter portion 116, first diameter portion 120, the second diameter portion 122, the third diameter portion 124, and the stud flange 112 can be in coaxial alignment and/or concentric.

When preparing to secure the adapter stud system 100 to an optical device, the washer 104 and the fastener 106 can be placed over and/or around the adapter stud 102. The fastener 106 can be moved to a tightened position to compress an optical device adapter housing between the washer 104 and the stud flange 112 to secure the adapter stud system 100 to the optical device.

The washer 104 can be configured to receive the adapter stud 102 at least partially therethrough. The washer 104 can comprise an aperture 126 configured to receive the adapter stud 102. The aperture 126 can be oblong. The aperture 126 can be shaped as a double-D aperture. The centerline axis of the aperture 126 can be offset from the centerline axis of the washer 104. The aperture 126 can be at least partially defined by one or more rounded (e.g., circular) surfaces 127. In various aspects, the aperture 126 is defined by two opposing rounded surfaces 127. The aperture 126 can be at least partially defined by one or more clocking surfaces 128. The clocking surfaces 128 can be flat and/or linear surfaces. In various aspects, the aperture 126 is defined by two opposing clocking surfaces 128. The opposing clocking surfaces 128 can extend between and to the opposing rounded surfaces 127. The one or more clocking surfaces 128 are configured to contact a stud surface (e.g., a stopping surface 130 of the second diameter portion 122 and/or a stopping surface 132 of the third diameter portion 124) of the adapter stud 102 for at least partially preventing rotation of the washer 104 with respect to the adapter stud 102. Stated differently, the one or more clocking surfaces 128 can ensure that the washer 104 is clocked at the desired rotational position relative to the adapter stud 102. The stopping surface 130 and/or the stopping surface 132 can be a flat and/or linear surface. More particularly, the clocking surface(s) 128 can engage (i.e., contact) the stopping surface 130 and/or the stopping surface 132 while the fastener 106 is being tightened to prevent the washer 104 from rotating together with the fastener 106. In this manner, the clocking surface(s) 128 can engage (i.e., contact) the stopping surface 130 and/or the stopping surface 132 to maintain a rotational position of the washer 104 with respect to the adapter stud 102.

In various aspects, the shape of the third diameter portion 124 is complementary to the shape of the aperture 126. The shape of the third diameter portion 124 can be complementary to the shape of the second diameter portion 122. The third diameter portion 124 can include one or more rounded (e.g., circular) surfaces 131. In various aspects, the third diameter portion 124 is defined by two opposing rounded surfaces 131. The third diameter portion 124 can include one or more stopping surfaces 132. In various aspects, the third diameter portion 124 includes two opposing stopping surfaces 132. The opposing stopping surfaces 132 can extend between and to the opposing rounded surfaces 131. The aperture 126 and the third diameter portion 124 can comprise any suitable complementary shape that causes the washer 104 to interlock with the adapter stud 102 to prevent rotation of the washer 104 with respect to the adapter stud 102 (e.g., a keyway, a star shape, a polygonal shape, a D-shape, etc.). In this regard, the aperture 126 can be configured to interlock with the third diameter portion 124 to prevent rotation of the washer 104 with respect to the adapter stud 102. Stated differently, the washer 104 can be clocked together with the adapter stud 102.

The fastener 106 can be configured to receive the adapter stud 102 at least partially therethrough. The fastener 106 can include a threaded inner diameter surface whereby the fastener 106 is configured to threadingly couple to the threaded portion 114 of the adapter stud 102. The fastener 106 can be a hex nut, in accordance with various examples; though the outer surface of the fastener 106 can comprise any suitable shape (e.g., triangular, square, star, etc.).

Figure 2A:
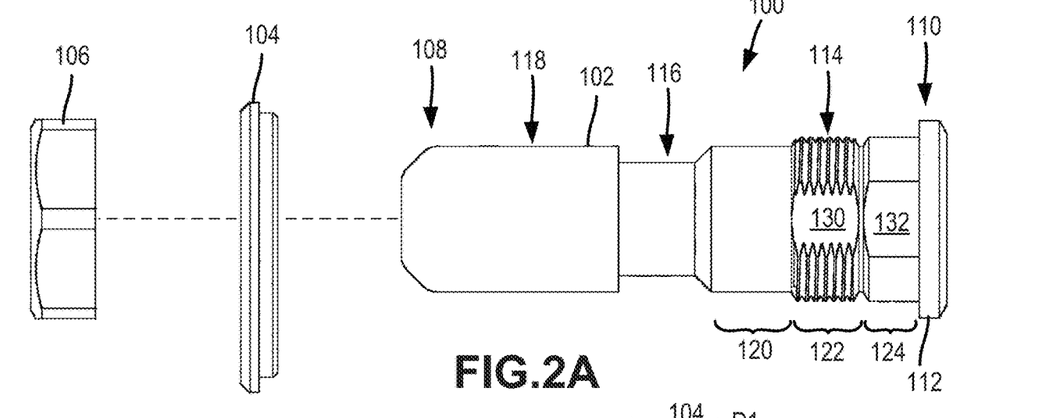
FIG. 2A is a side assembly view of the adapter stud system of FIGS. 1A and 1B, in accordance with various examples.

FIG. 2A is a side assembly view of the adapter stud system 100, in accordance with various aspects. With respect to FIG. 2A through FIG. 2C, elements with like element numbering, as depicted in FIG. 1A and FIG. 1B, are intended to be the same and will not necessarily be repeated for the sake of concision.

Figure 2B:
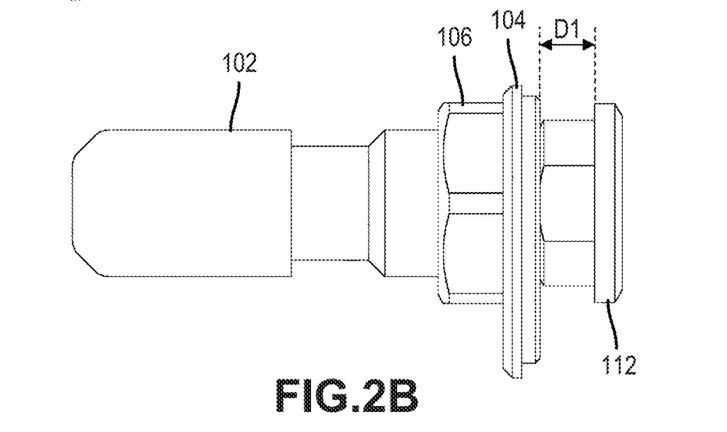
FIG. 2B is a side view of the adapter stud system of FIG. 2A with the washer and the fastener installed loosely over the adapter stud in a first (e.g., loose) position, in accordance with various examples.

FIG. 2B is a side view of the adapter stud system 100 with the washer 104 and the fastener 106 placed over the adapter stud 102 with the fastener 106 having started to be threaded onto the threaded portion 114 of the adapter stud 102 in a first (e.g., loose) position. The washer 104 can be spaced apart from the stud flange 112 by a first dimension D1 in this first position. With the fastener 106 and the washer 104 in the first position, the adapter stud system 100 can be prepared to be installed onto an optical device.

Figure 2C:
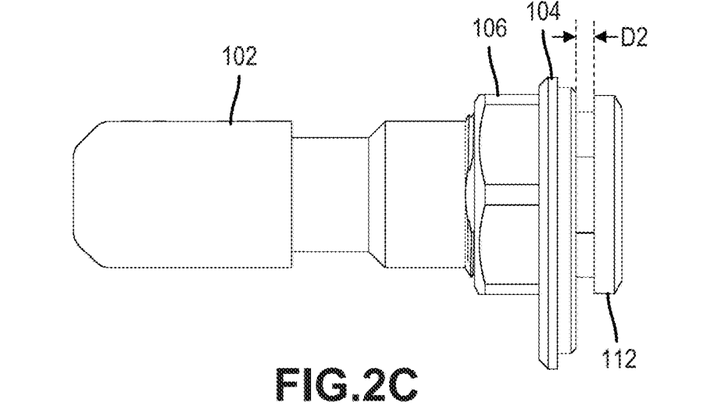
FIG. 2C is a side view of the adapter stud system of FIG. 2A with the washer and the fastener installed over the adapter stud in a second (e.g., tightened) position, in accordance with various examples.

FIG. 2C is a side view of the adapter stud system 100 with the washer 104 and the fastener 106 placed over the adapter stud 102 with the fastener 106 tightened onto the threaded portion 114 of the adapter stud 102 in a second (e.g., tightened) position. The washer 104 can be spaced apart from the stud flange 112 by a second dimension D2 in this second position. The second dimension D2 is less than the first dimension D1. The second dimension D2 can be substantially equal to a width of an optical device adapter housing flange, as described in greater detail herein.

Figure 3A:
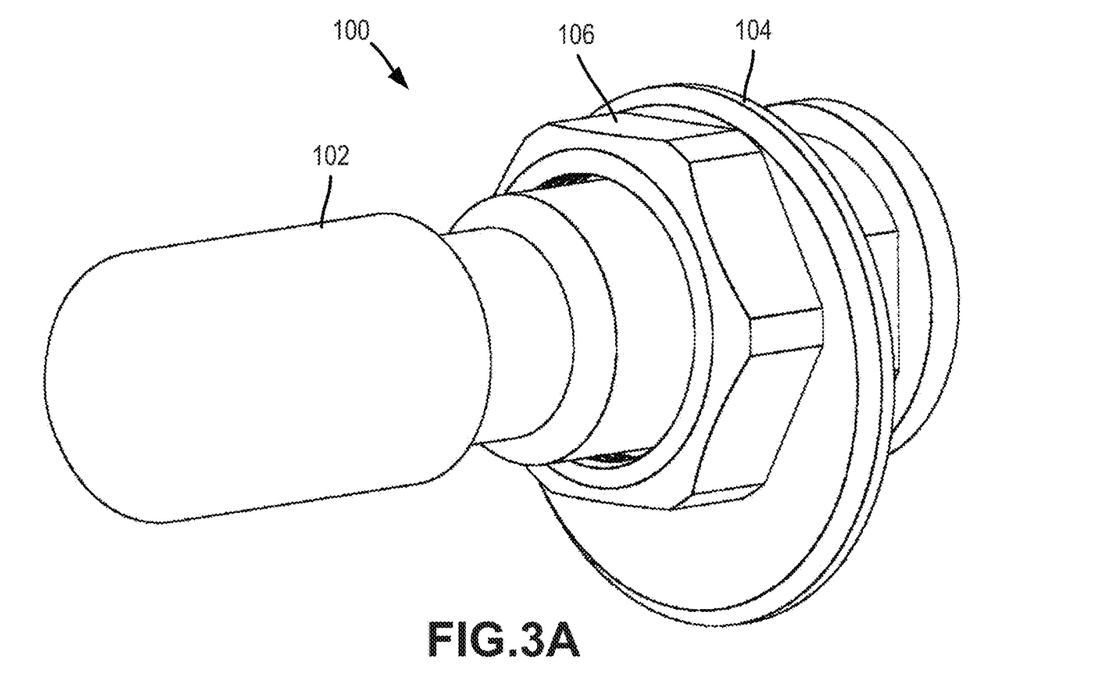
FIG. 3A and FIG. 3B are front perspective views of the adapter stud system with the fastener and the washer in the first position and the second positions, respectively, in accordance with various examples.
Figure 3B:
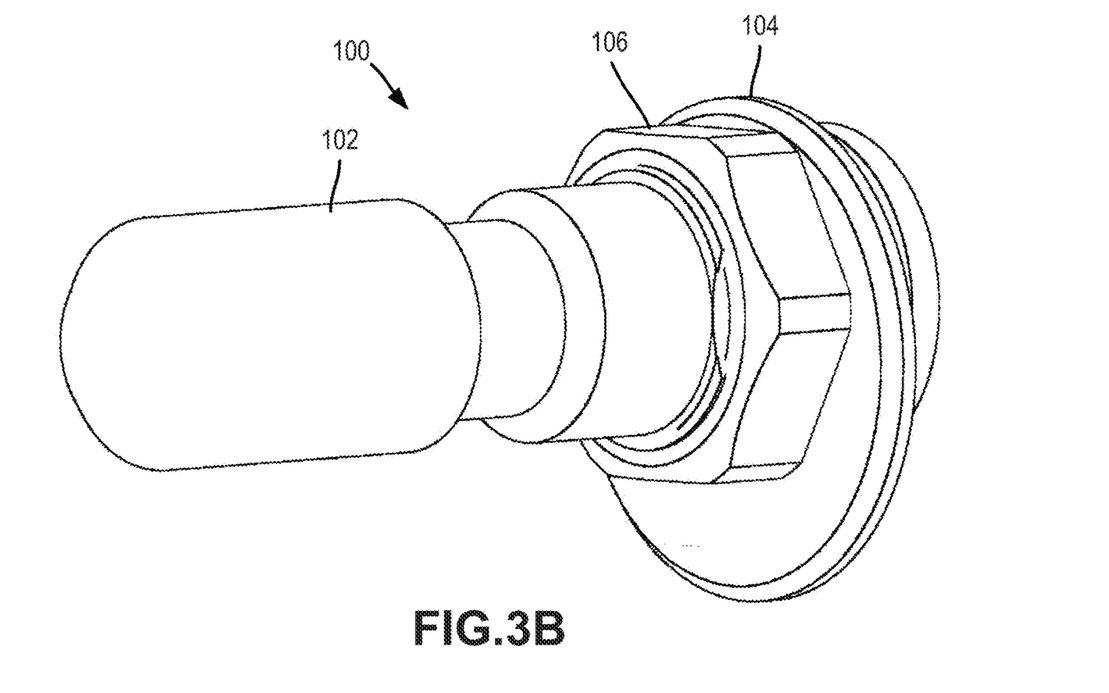
Figure 4A:
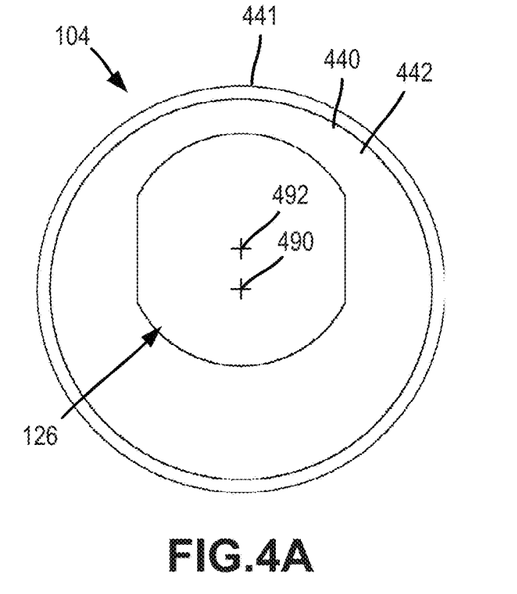
FIG. 4A, FIG. 4B, FIG. 4C, and FIG. 4D are front, rear, front perspective, and side views, respectively, of a washer for an adapter stud, in accordance with various examples.
Figure 4B:
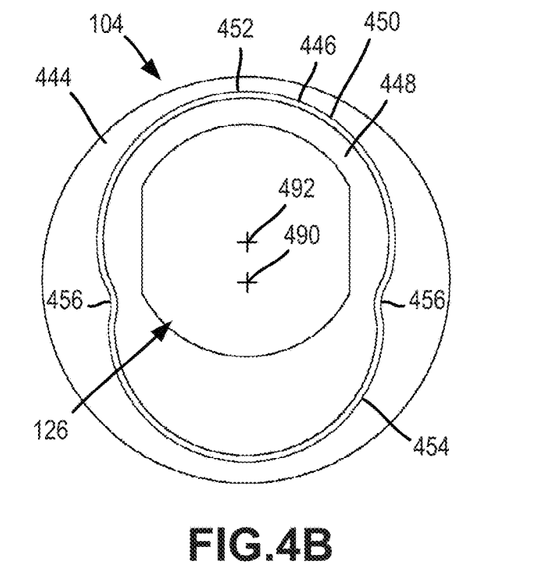
Figure 4C:
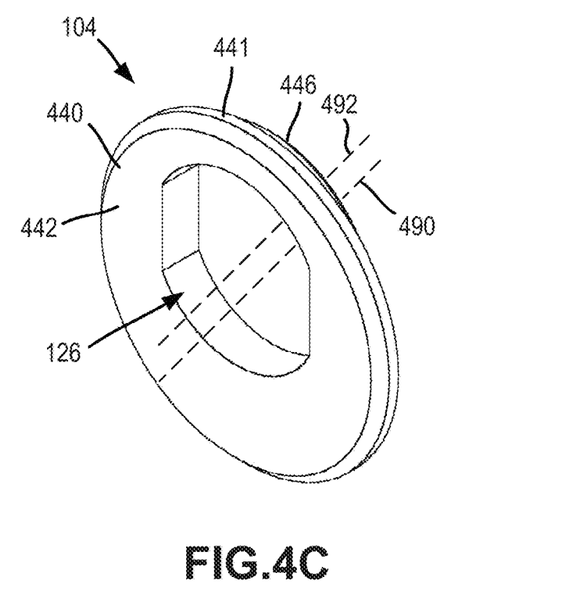
Figure 4D:
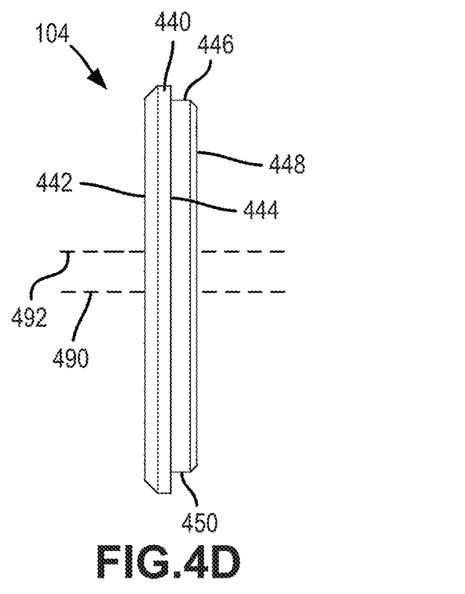

FIG. 3A and FIG. 3B are front perspective views of the adapter stud system 100 with the fastener 106 and the washer 104 in the first position and the second position, respectively.

FIG. 4A, FIG. 4B, FIG. 4C, and FIG. 4D are front, rear, front perspective, and side views, respectively, of the washer 104, in accordance with various aspects. The washer 104 can include a round body 440. The round body 440 can be in the form of a flat round plate. The shape of the round body 440 may be adapted to the particular optical device onto which the washer 104 is being installed. In various aspects, the round body 440 can be circular or ovular. The round body 440 can include a first surface 442 (e.g., a front face) and a second surface 444 (e.g., a rear face). The first surface 442 can face a first direction and the second surface 444 can face a second direction opposite the first direction. The first direction and the second direction can be parallel to the centerline axis 490. The aperture 126 can extend through the first surface 442.

The washer 104 can comprise a centerline axis 490. The centerline axis 490 can be defined by the outer surface 441 of the round body 440. The outer surface 441 can be round (e.g., circular or ovular), or define any other suitable shape.

The aperture 126 can comprise a centerline axis 492. Stated differently, the centerline axis 492 can extend through a center of the aperture 126. The centerline axis 492 can be parallel with the centerline axis 490. The centerline axis 492 can be spaced apart from the centerline axis 490. In this regard, the aperture 126 may not be centered in the round body 440. In this regard, the aperture 126 can be eccentric relative to the washer 104, the aperture 126 having the centerline axis 492 (also referred to as a first centerline axis) offset from the centerline axis 490 (also referred to as a second centerline axis) of the washer 104.

In various aspects, a flange 446 (also referred to herein as a washer flange) can extend or protrude from the second surface 444 (e.g., extending axially). The flange 446 can extend from the second surface 444 in the second direction (i.e., away from the first surface 442). The flange 446 can include a third surface 448. The third surface 448 can be oriented substantially parallel with respect to the second surface 444. The third surface 448 can be oriented substantially parallel with respect to the first surface 442. The aperture 126 can extend through the round body 440 from the first surface 442 to the third surface 448.

The first surface 442 can be substantially flat (i.e., planar). The first surface 442 can be oriented substantially perpendicular to the centerline 490 of the washer 104. The second surface 444 can be substantially flat (i.e., planar). The second surface 444 can be oriented substantially perpendicular to the centerline 490 of the washer 104. The third surface 448 can be substantially flat (i.e., planar). The third surface 448 can be oriented substantially perpendicular to the centerline 490 of the washer 104.

In various aspects, a depth (measured parallel to the centerline axis 490) of the round body 440 (i.e., from the first surface 442 to the second surface 444) can be substantially equal to a depth (measured parallel to the centerline axis 490) of the flange 446 (i.e., from the second surface 444 to the third surface 448). The depth of the round body 440 can be between 50% and 200% of the depth of the flange 446, in accordance with various aspects, between 75% and 135% of the depth of the flange 446, in accordance with various aspects, or between 90% and 112% of the depth of the flange 446, in accordance with various aspects.

The flange 446 can be circumscribed by an outer surface 450. The outer surface 450 can be shaped and sized to be complementary to a shape of an adapter housing of an optical device to which the washer 104 is configured to be installed. The outer surface 450 can extend between and to the second surface 444 and the third surface 448. The outer surface 450 can be a double radius surface having a first radius portion 452 and a second radius portion 454. The first radius portion 452 can have a larger radius than the second radius portion 454. Blending surfaces 456 can be disposed at the intersection between the first radius portion 452 and the second radius portion 454. The blending surfaces 456 can be concave surfaces. The double radius shape of the outer surface 450 can aid in aligning the washer 104 with an adapter housing of an optical device, as described in greater detail herein. In various aspects, the aperture 126 can be centered with respect to the first radius portion 452.

Figure 5A:
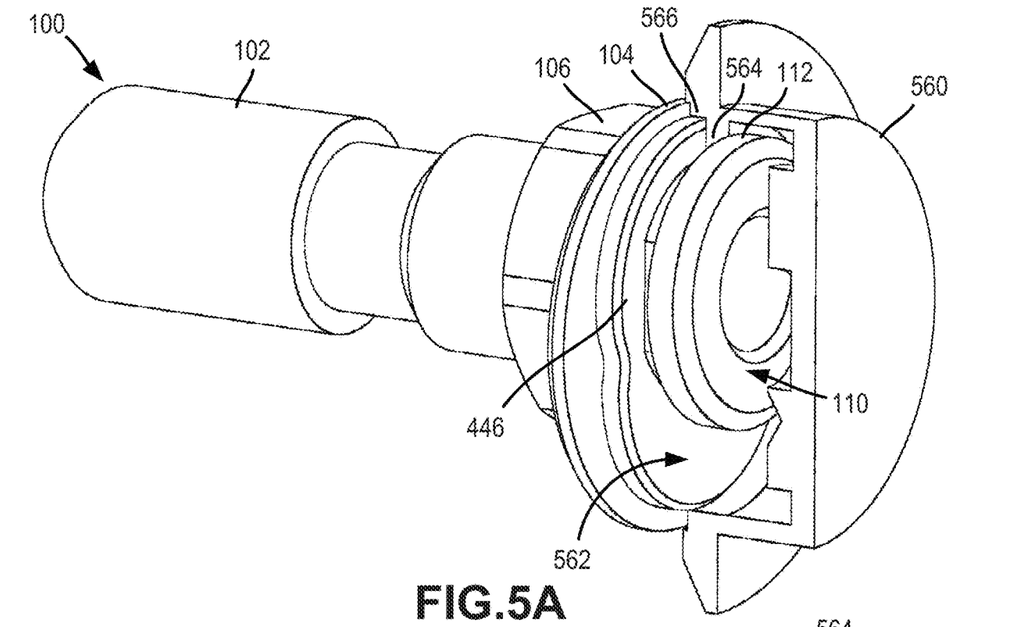
FIG. 5A and FIG. 5B are rear perspective and side views, respectively, of an adapter stud system installed in an adapter housing for an optical device, in accordance with various examples.
Figure 5B:
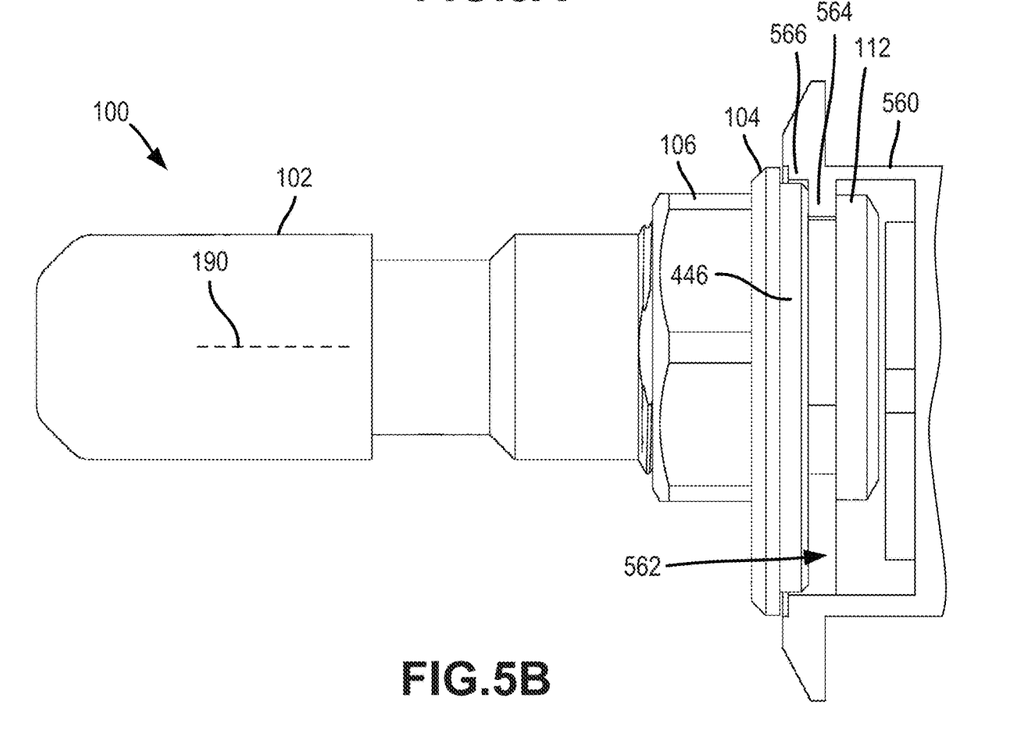

FIG. 5A and FIG. 5B are rear perspective and side views, respectively, of the adapter stud system 100 installed in an adapter housing 560 of an optical device. A cutaway view, taken along line 5-5 of FIG. 8A, of the adapter housing 560 is depicted for clarity purposes. The adapter housing 560 can be mirrored about the cutaway line. The adapter housing 560 includes an opening 562 configured to receive the second end 110 of the adapter stud 102. The stud flange 112 can be received into the opening 562. The washer 104 can be partially received into the opening 562.

The adapter stud system 100 can be configured to receive a portion of the adapter housing 560 in between the stud flange 112 and the washer 104. The adapter stud system 100 can be configured to receive a portion of the adapter housing 560 in between the stud flange 112 and the flange 446 of the washer 104. The adapter housing 560 can include a housing flange 564. The housing flange 564 can extend (e.g., radially inward) into the opening 562. The housing flange 564 can extend inward into the opening 562 perpendicular to the centerline axis 190 of the adapter stud 102. The adapter stud system 100 can be configured to receive the housing flange 564 in between the stud flange 112 and the washer 104. The adapter stud system 100 can be configured to compress the housing flange 564 in between the stud flange 112 and the washer 104 in response to the fastener 106 being moved to the tightened position (i.e., tightened against the washer 104). Because the washer 104 is prevented from rotating with the fastener 106 via the clocking surface 128 and the stopping surface 132, (with momentary reference to FIG. 1A) the washer 104 tends to not impart torque forces into the adapter housing 560 while the fastener 106 is rotated to the tightened position. Stated differently, the washer 104 does not rotate about the centerline axis 190 with respect to the adapter housing 560 when the fastener 106 is rotated to the tightened position. In this regard, the rotating motion of the fastener 106 tends to be isolated from the adapter housing 560. The fastener 106 may slide against the washer 104 when the fastener 106 is rotated to the tightened position.

The adapter housing 560 can include a housing flange 566. The housing flange 566 can be coplanar (i.e., a plane oriented perpendicular with respect to the centerline axis 190) with the flange 446 when the washer 104 is in the installed position. The housing flange 566 can have a shape that is complementary to the shape of the flange 446.

Figure 6:
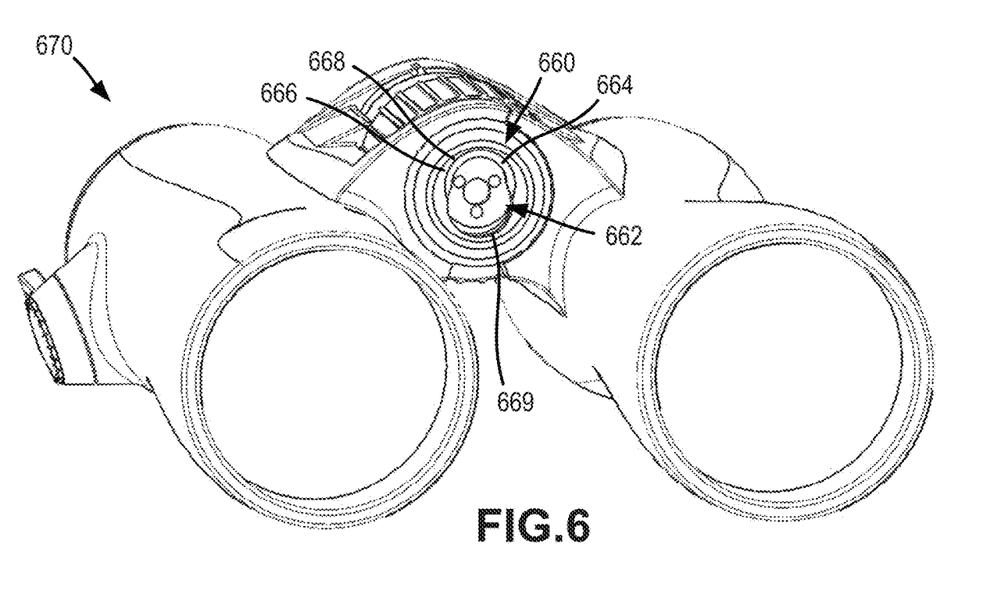
FIG. 6 is a front perspective view of an example optical device having an adapter housing configured to receive an adapter stud system, in accordance with various examples.

FIG. 6 is a front perspective view of an example optical device 670 configured to receive an adapter stud system. The optical device 670 is in the form of binoculars in FIG. 6, though it is contemplated herein that the optical device 670 could be any suitable optical device, such as a binocular, monocular, spotting scope, or telescope, among others. The optical device 670 can include an adapter housing 660. The adapter housing 660 can include an opening 662. The adapter housing 660 can include a housing flange 664. The adapter housing 660 can include a housing flange 666. The adapter housing 660 can be similar to the adapter housing 560 described with respect to FIG. 5A and FIG. 5B. The opening 662, the housing flange 664, and the housing flange 666 can be similar to the opening 562, the housing flange 564, and the housing flange 566, respectively, described with respect to FIG. 5A and FIG. 5B.

In various aspects, the housing flange 666 can include a double radius surface having a first radius portion 668 and a second radius portion 669. The first radius portion 668 can have a larger radius than the second radius portion 669. The shape of the housing flange 666 can be complementary to the shape of the flange 446 (with momentary reference to FIG. 4B).

Figure 7A:
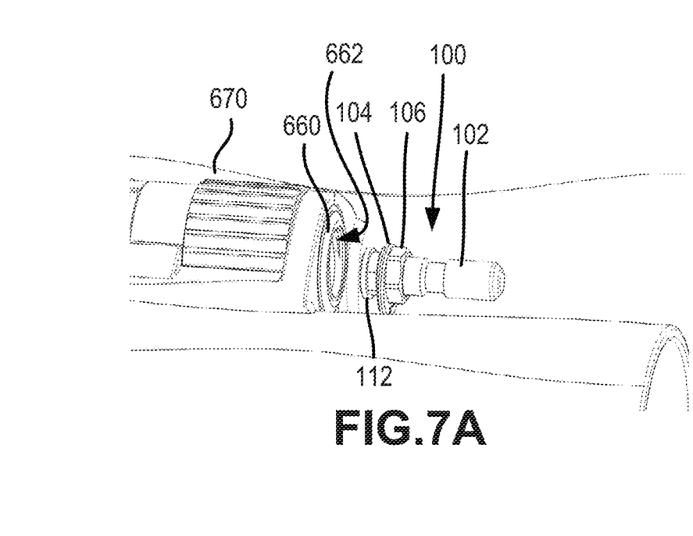
FIG. 7A, FIG. 7B, FIG. 7C, and FIG. 7D show various steps of the adapter stud system being installed to the adapter housing of the optical device, in accordance with various examples.

FIG. 7A, FIG. 7B, FIG. 7C, and FIG. 7D show the adapter stud system 100 being installed to the adapter housing 660 of the optical device 670. The adapter stud system 100 can be prepared for installation by assembling the washer 104 and the fastener 106 over the adapter stud 102, for example as illustrated in FIG. 2B. With reference to FIG. 7A, the loosely assembled adapter stud system 100 can be aligned with and moved toward the opening 662 in the adapter housing 660. The fastener 106 and the washer 104 can be loosely coupled with the adapter stud 102 to make a gap (see dimension D1 of FIG. 2B) between the washer 104 and the stud flange 112.

Figure 7B:
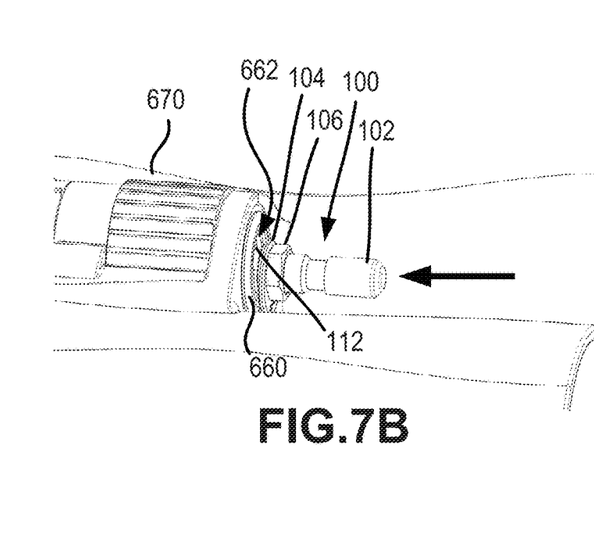

With combined reference to FIG. 6 and FIG. 7B, the loosely assembled adapter stud system 100 can be partially inserted into the opening 662. The second end of the adapter stud 102 can be inserted into the opening 662. The stud flange 112 can be inserted into the opening 662. The stud flange 112 can be inserted through the second radius portion 669. The stud flange 112 can be inserted through the second radius portion 669 and past the first radius portion 668.

Figure 7C:
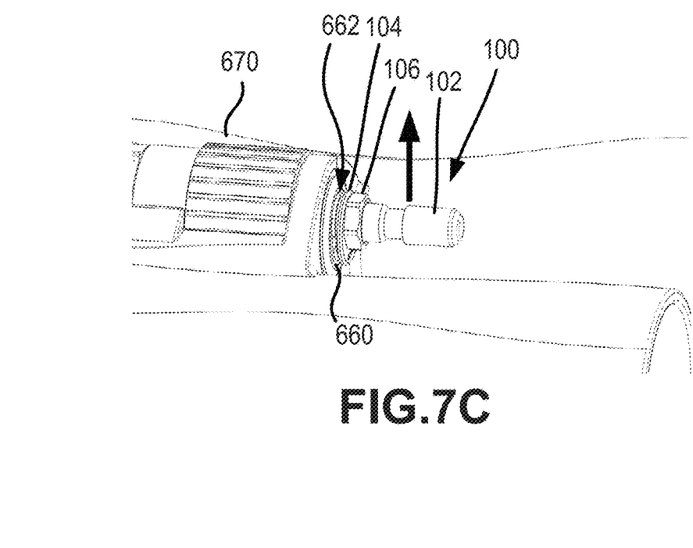

With combined reference to FIG. 6 and FIG. 7C, with the stud flange 112 of the loosely assembled adapter stud system 100 inserted through the second radius portion 669 and past the first radius portion 668, the adapter stud system 100 can be translated (e.g., slid) laterally (e.g., radially with respect to radius portions 668 and 669) away from the second radius portion 669 toward the first radius portion 668 (see arrow in FIG. 7C). The housing flange 664 can be positioned between the stud flange 112 and the washer 104 in response to the adapter stud system 100 being translated (e.g., slid) laterally away from the second radius portion 669 toward the first radius portion 668 (e.g., see FIG. 5B).

Figure 7D:
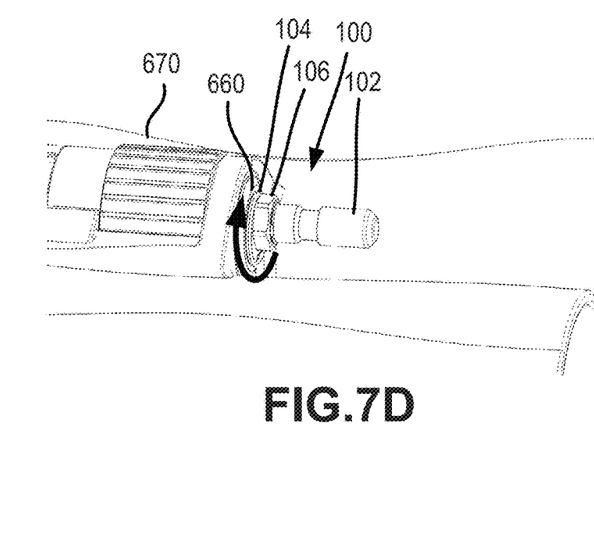

With combined reference to FIG. 7D, the fastener 106 can be tightened to compress the housing flange 664 between the stud flange 112 and the washer 104. Tightening the fastener 106 can also urge the washer 104 to seat fully into the housing flange 666. In various aspects, the fastener 106 can be tightened by hand. In various aspects, the fastener 106 can be tightened using a tool, such as a wrench or socket. In various aspects, the fastener 106 can be tightened using a tool, such as a wrench or socket, using a predetermined torque to ensure the tightened adapter stud system 100 is secured to the adapter housing 660 and/or to prevent over-tightening.

Figure 8A:
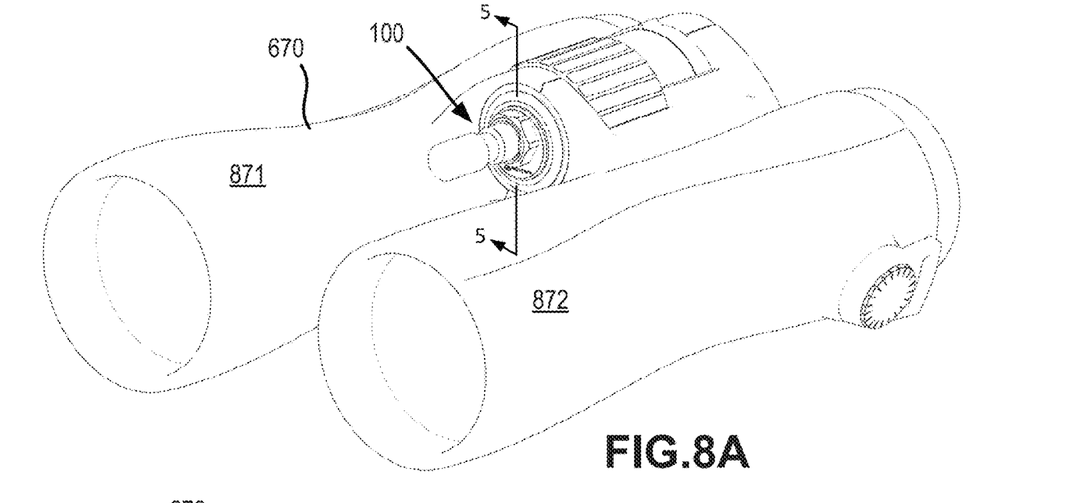
FIG. 8A and FIG. 8B show front perspective and top views, respectively, of the adapter stud system installed in the optical device, in accordance with various examples.
Figure 8B:
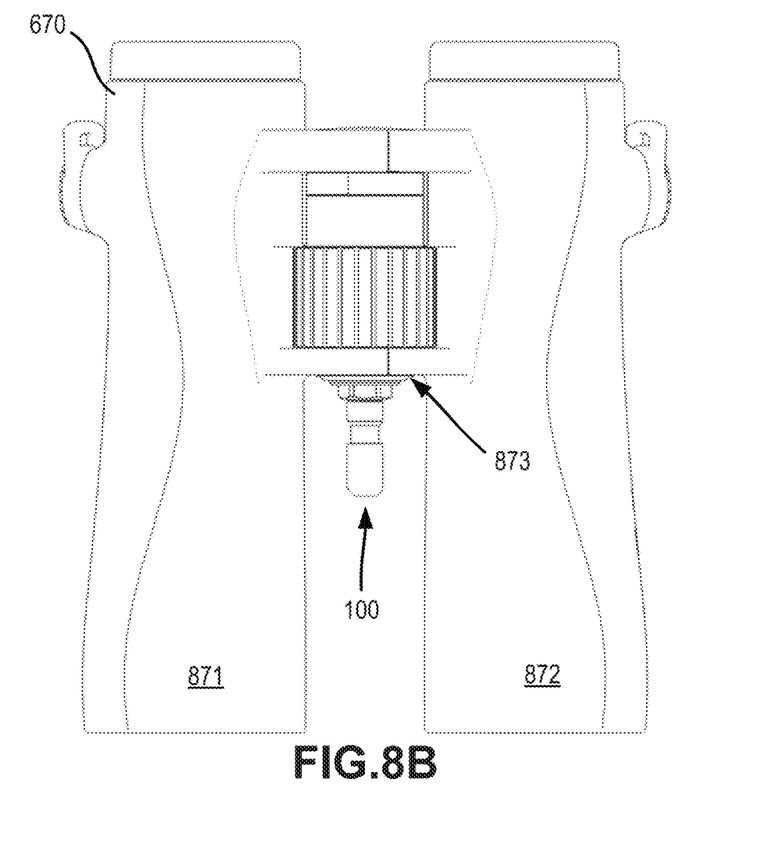

FIG. 8A and FIG. 8B show front perspective and top views, respectively, of the adapter stud system 100 installed onto the optical device 670. The optical device 670 may have a first barrel 871 and a second barrel 872 that may be pivotally connected by a hinging mechanism 873. In the installed position, the adapter stud system 100 can be located between the first barrel 871 and a second barrel 872. In the installed position, the adapter stud system 100 can be located at the hinging mechanism 873.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", "various aspects", "one aspect", "an aspect", "an example aspect", etc., indicate that the embodiment or aspect described may include a particular feature, structure, or characteristic, but every embodiment or aspect may not necessarily include the particular feature, structure, or characteristic. Moreover, such phrases are not necessarily referring to the same embodiment or aspect. Further, when a particular feature, structure, or characteristic is described in connection with an embodiment or aspect, it is submitted that it is within the knowledge of one skilled in the art to affect such feature, structure, or characteristic in connection with other embodiments or aspects whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adapter stud system for an optical device, comprising:
   an adapter stud including a first end, a second end, a stud flange disposed at the second end, and a threaded portion disposed between the stud flange and the first end;
   a washer configured to receive the adapter stud at least partially therethrough, wherein the washer includes: (i) a first surface facing a first direction and configured to contact the fastener (ii) a second surface facing a second direction opposite the first direction, (iii) a washer flange extending from the second surface and comprising a third surface facing the second direction, and (iv) a double radius outer surface circumscribing the washer flange and disposed between the second surface and the third surface, wherein the double radius outer surface comprises a first radius portion and a second radius portion; and
   a fastener configured to receive the adapter stud at least partially therethrough, wherein the fastener is configured to threadingly couple to the threaded portion of the adapter stud, wherein the fastener is configured to be moved to a tightened position to compress an optical device adapter housing between the washer and the stud flange to secure the adapter stud system to the optical device.

2. The adapter stud system of claim 1, wherein the adapter stud further comprises a reduced diameter portion disposed between the threaded portion and the first end.

3. The adapter stud system of claim 2, wherein the stud flange, the threaded portion, and the reduced diameter portion are in coaxial alignment.

4. The adapter stud system of claim 1, wherein:
the adapter stud comprises a stopping surface; and
the washer comprises an aperture configured to receive the adapter stud, wherein the aperture is at least partially defined by a clocking surface configured to contact the stopping surface of the adapter stud for preventing rotation of the washer with respect to the adapter stud.

5. The adapter stud system of claim 4, wherein the aperture is an eccentric aperture relative to the washer, the aperture having a first centerline axis offset from a second centerline axis of the washer.

6. The adapter stud system of claim 4, wherein the adapter stud includes a first diameter portion, a second diameter portion having a second diameter that is greater than a first diameter of the first diameter portion, and a third diameter portion having a third diameter that is one of equal to or greater than the second diameter.

7. The adapter stud system of claim 6, wherein the second diameter portion comprises the threaded portion, and the third diameter portion comprises the stopping surface.

8. The adapter stud system of claim 1, wherein the double radius outer surface further comprises a blending portion disposed at an intersection between the first radius portion and the second radius portion.

9. The adapter stud system of claim 1, wherein the washer comprises an aperture extending between and to the first surface and the third surface.

10. The adapter stud system of claim 1, wherein the washer comprises an aperture defined by two opposing round surfaces and two opposing clocking surfaces, wherein the two opposing clocking surfaces extend between and to a first round surface of the two opposing round surfaces and a second round surface of the two opposing round surfaces.

11. An adapter stud system for an optical device, comprising:
an adapter stud including a first end, a second end, a stud flange disposed at the second end, a threaded portion disposed between the stud flange and the first end, and a stopping surface;
a washer comprising (i) an aperture configured to receive the adapter stud and (ii) a clocking surface configured to contact the stopping surface of the adapter stud to prevent rotation of the washer with respect to the adapter stud, wherein a first centerline of the aperture is offset from a second centerline of the washer; and
a fastener configured to threadingly couple to the threaded portion of the adapter stud, wherein the fastener is configured to be moved to a tightened position to compress an optical device adapter housing between the washer and the stud flange to secure the adapter stud system to the optical device.

12. The adapter stud system of claim 11, wherein the clocking surface at least partially defines the aperture.

13. The adapter stud system of claim 11, wherein the washer includes:
a first surface facing a first direction, wherein the first surface is configured to contact the fastener;
a second surface facing a second direction opposite the first direction; and
a washer flange extending from the second surface and defining a third surface facing the second direction, wherein the aperture extends between and to the first surface and the third surface.

14. The adapter stud system of claim 13, wherein the washer further includes an outer surface circumscribing the washer flange and disposed between the second surface and the third surface, and the outer surface comprises a first radius portion, a second radius portion, and a blending portion disposed at an intersection between the first radius portion and the second radius portion.

15. The adapter stud system of claim 11, wherein the aperture is defined by two opposing round surfaces and two opposing clocking surfaces, wherein the two opposing clocking surfaces extend between and to a first round surface of the two opposing round surfaces and a second round surface of the two opposing round surfaces.

16. The adapter stud system of claim 12, wherein the adapter stud includes a first diameter portion, a second diameter portion having a second diameter that is greater than a first diameter of the first diameter portion, and a third diameter portion having a third diameter that is one of equal to or greater than the second diameter, wherein the second diameter portion comprises the threaded portion, and the third diameter portion comprises the stopping surface.

17. An adapter stud system for an optical device, comprising:
an adapter stud including a first end, a second end, a stud flange disposed at the second end, a threaded portion disposed between the stud flange and the first end, a first diameter portion, a second diameter portion having a second diameter that is greater than a first diameter of the first diameter portion, and a third diameter portion having a third diameter that is one of equal to or greater than the second diameter, wherein the second diameter portion comprises the threaded portion, and the third diameter portion comprises a stopping surface;
a washer comprising (i) an aperture configured to receive the adapter stud, and (ii) a clocking surface at least partially defining the aperture, the clocking surface is configured to contact the stopping surface of the adapter stud for preventing rotation of the washer with respect to the adapter stud; and
a fastener configured to receive the adapter stud at least partially therethrough, wherein the fastener is configured to threadingly couple to the threaded portion of the adapter stud, wherein the fastener is configured to be moved to a tightened position to compress an optical device adapter housing between the washer and the stud flange to secure the adapter stud system to the optical device.

\* \* \* \* \*